(12) United States Patent
Saillet et al.

(10) Patent No.: US 11,175,951 B2
(45) Date of Patent: Nov. 16, 2021

(54) RESOURCE AVAILABILITY-BASED WORKFLOW EXECUTION TIMING DETERMINATION

(71) Applicant: International Business Machines Corporation, Armonk, NY (US)

(72) Inventors: Yannick Saillet, Stuttgart (DE); Namit Kabra, Hyderabad (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 246 days.

(21) Appl. No.: 16/424,941

(22) Filed: May 29, 2019

(65) Prior Publication Data

US 2020/0379803 A1 Dec. 3, 2020

(51) Int. Cl.
*G06F 9/46* (2006.01)
*G06F 9/48* (2006.01)
*G06N 20/00* (2019.01)
*G06F 9/50* (2006.01)

(52) U.S. Cl.
CPC .......... *G06F 9/4887* (2013.01); *G06F 9/5027* (2013.01); *G06N 20/00* (2019.01)

(58) Field of Classification Search
None
See application file for complete search history.

(56) References Cited

U.S. PATENT DOCUMENTS

| 10,089,144 | B1 | 10/2018 | Nagpal | |
|---|---|---|---|---|
| 2009/0119238 | A1* | 5/2009 | Amini | G06F 9/5027 706/46 |
| 2015/0178129 | A1* | 6/2015 | Dube | G06F 9/4881 718/106 |
| 2016/0328273 | A1* | 11/2016 | Molka | G06F 9/505 |
| 2017/0046203 | A1 | 2/2017 | Singh | |
| 2017/0052814 | A1 | 2/2017 | Aguiar | |
| 2019/0058669 | A1* | 2/2019 | Duarte | H04L 41/5009 |
| 2020/0174844 | A1* | 6/2020 | Bergsma | G06F 9/48 |

OTHER PUBLICATIONS

Yan et al., "Scientific Workflow Scheduling in Computational Grids—Planning, Reservation, and Data/Network-Awareness", 2007, IEEE, pp. 18-25. (Year: 2007).*
Janardhanan, et al; "CPU Workload Forecasting of Machines in Data Centers Using LSTM Recurrent Neural Networks and ARIMA Models"; Mar. 26, 2018.

* cited by examiner

*Primary Examiner* — Kenneth Tang
(74) *Attorney, Agent, or Firm* — Fabian VanCott; Steven L. Nichols

(57) ABSTRACT

According to a computer-implemented method, an available amount of each of multiple computing resources is determined by machine logic over a period of time at a computing device. The machine logic also determines an expected usage of each computing resource to execute each workflow in a queue. The machine logic also determines a time of execution of each workflow in the queue based on the available amount of each of the multiple computing resources over time and the expected usage of each computing resource to execute each workflow in the queue.

22 Claims, 9 Drawing Sheets

RESOURCE AVAILABILITY-BASED WORKFLOW EXECUTION TIMING DETERMINATION

BACKGROUND

The present invention relates to workload management, and more specifically to the management of computing workloads and their usage of particular computing resources such as a central processing unit (CPU), system memory, system cache, and system input/output interface hardware.

A workload manager is a system that schedules the execution of one or multiple computing workflows so that the utilization of the resources required by these workflows is maximized, but does not exceed a maximum limit. In other systems, a workload manager monitors the availability of critical resources of the system such as CPU usage, available random-access memory (RAM), input/output (I/O) utilization, etc., and maintains a queue of requests. When a workflow is added to the queue, the system starts immediately or delays the execution of the workflow based on how much resources are available. For instance, a workload manager may be set up to block any new incoming workflow if more than five workflows are already running, or if the CPU or RAM usage is more than 80%. At regular intervals, the system will check if the conditions allowing the execution of a new workflow are met or not i.e., after one of the running workflows has completed, and will start the next workflow in the queue as soon as the actual system resource usage allows it. In this example, the workflows in the queue have to wait until they are at the top of the queue and the conditions allowing a new workflow to be executed are met. In some examples, workflows may be associated with different priorities, and a workload manager may prefer the execution of high priority workflows compared to workflows with lower priority. However, the general process described above is the same.

The problem with these classical approaches is that that not all workflows waiting in the queue will have the same resource consumption. That is, some workflows may be more CPU hungry, while other workflows may require more RAM, while other workflows may require very low resources in general. Another problem is that the resource usage of a workflow during its execution may not be constant. An example of this second type of problem is a workflow that reads a large volume of data from a source. Such a workflow would sort the data first and then apply, on the sorted data, a data classification operation, such as the typical workflow that a data profiling and data classification analysis would produce. When observing the resource usage during the execution of such a workflow, it could be noticed that this workflow requires, in the first phase, mostly I/O resources (network bandwidth) to load the data from the source. Then in a second phase, the workflow requires mostly disk usage and moderate CPU usage for doing the sorting. The second phase is followed by a third phase stage which has high CPU usage and low disk usage when applying the classification operations.

However, classical workflow management devices do not account for varying resource usage over time. The fact that not all workflows have the same resource usage and that even a single workflow does not have the same resource usage though its complete execution leads to the effect that workload managers can make bad decisions when deciding to start or delay a workflow. For example, a workload management system may decide not to start any more workflows to avoid an overcommitment of the system, even though some workflows in the queue may have a low resource usage and their execution could still be allowed without risking an overcommitment. As another example, a workload management system may decide that it is safe to start the next workflow because, at the time of that decision, the resource usage was low. However, the system may not see that the workflows currently running still have not reached their maximum peak in resource usage. Accordingly, the system may be overcommitted after a while. To avoid overcommitment problems described in the second example, administrators may apply conservative thresholds, which would stop any new execution far before the system is at its maximum utilization. However, this may cause under-utilization and slower workflow executions because of the problems described by the first example where workflows are not started to avoid overcommitment of the system.

SUMMARY

According to an embodiment of the present invention, a computer-implemented method is described. According to the method, an available amount of each of multiple computing resources is determined, by machine logic, over time at a computing device. The machine logic also determines an expected usage of each computing resource to execute each workflow in a queue. The machine logic also determines a time of execution of each workflow in the queue based on the available amount of each of the multiple computing resources over time and the expected usage of each computing resource to execute each workflow in the queue. Accordingly, the present method is advantageous in that, as opposed to classical approaches, it makes a determination regarding execution timing not just based on general computing resource usage, but makes the determination based on 1) each computing resource individually and 2) the expected usage of each computing resource to complete a particular workflow. That is, even though a CPU usage may be above a threshold, where a classical approach would preclude execution, the present system and method may allow the workflow to execute because the workflow is not expected to result in overcommitment of CPU processing resources.

In one optional example of this method, determining, by the machine logic, a time of execution of each workflow in the queue is further based on a maximum usage for each computing resource. Doing so ensures that a maximum usage level of a computing resource is not exceeded and that the particular computing resource is not overcommitted.

In another optional example of this method, determining, by the machine logic, a time of execution of each workflow in the queue further comprises simulating each possible execution order of the multiple workflows to determine an execution order that maximizes system resource usage. Such a comprehensive operation ensures that a most effective execution order of all jobs in a queue is determined and executed.

In another optional example of this method, determining, by the machine logic, a time of execution of each workflow in the queue further includes 1) determining, at a particular point in time, an availability of a first computing resource and 2) scheduling a workflow consuming a large amount of the first computing resource to start at the particular point in time so long as a resulting computing resource usage over time does not peak to greater than a threshold amount. Such an option allows for maximum resource utilization by scheduling a workflow that consumes a large amount of a particular resource at a time when the particular computing resource is most capable of handling that workflow.

The present specification also describes a system. The system includes a resource analyzer to determine an available amount of each of multiple computing resources over time at a computing device. The system also includes a workflow analyzer to determine an expected usage of each computing resource to execute each workflow in a queue. The system also includes a scheduler to determine a time of execution of each workflow in the queue based on the available amount of each of the multiple computing resources over time and the expected usage of each computing resource to execute each workflow in the queue. Such a system is more efficient and more error resistant during execution of data processing workflows. For example, as described above, different workflows may utilize computing resources differently and the current system, as opposed to classical systems, accounts for the unique computing resource consumption of each job and may thus allow certain workflows even though overall computing resource usage is above a threshold level, so long as the certain workflows would not result in an overcommitment of the resources over time.

In one optional example of the system, the system also includes a graph generator. The graph generator 1) generates a time-based graph of the available amount of each of the multiple computing resources over time and 2) superimposes on the time-based graph, expected usage of each computing resource to execute each workflow in the queue. This is done in order to determine if computing resource usage exceeds a maximum value over the execution of the workflow and to determine which workflow should be executed at which point in time to maximize the computing resource utilization without exceeding its maximum usage. Such a graph generator allows a user to visualize, and a system to determine, resource usage over time, which classical approaches may not account for as they may make determinations based on one point in time.

The present specification also describes a computer-implemented method. According to the computer-implemented method, machine logic schedules a number of workflows in a scheduling system for execution by a data processing system. The machine logic also optimizes a time of execution of each workflow. This is done by, 1) simulating an availability of multiple computing resources over a period of time, 2) simulating the expected usage of each computing resource to execute each workflow from a start point of execution, 3) creating a superimposed time-based graph of computing resource usage to decide which workflow to execute at which point of time, and 4) rescheduling the workflows based on the superimposed time-based graph to form a queue of workflows wherein the multiple computing resource usage is maximized. Rescheduling the workflows based on simulated resource availability and expected usage allows for customized workflow execution based on system parameters as opposed to canned, out of the box thresholds. Moreover, creating a superimposed time-based graph allows for a visualization of the resource usage over time to verify, and allow manipulation of, workflow execution.

In one optional example of the method, optimizing a time of execution of each workflow is repeated multiple times during execution of workflows in the queue. Such an option is advantageous as it provides for real-time and dynamic workflow execution. For example, over a period of time different workflows may cease, or other operations of the computing system which consume the resources may terminate. The option described herein accounts for such changes to system operation.

In another optional example of the method, simulating the expected usage of each computing resource includes performing machine-learning of historical usage levels to predict an expected resource usage level based on job characteristics. Such an option is advantageous as it customizes workflow execution based on historical and specific information, rather than basing any determination on estimates or data which may be overgeneralized and not reflective of a particular data processing system.

In one optional example of machine-learning based simulation, simulating the expected usage of each computing resource includes determining stages of the workflow and determining stage characteristics for each stage. Each stage having predetermined expected resource usage levels based on the stage characteristics. Such an optional example is advantageous in that it allows for a quick determination of system usage based on the stages, i.e., loading, sorting, applying a filter, and predetermined usage values for those different stages.

In another optional example of machine-learning based simulation, simulating the expected usage of each computing resource includes determining stages of the workflow, determining stage characteristics for each stage, and performing machine-learning of historical usage levels to predict an expected resource usage level based on the stage characteristics for each stage. Such an optional example is advantageous in that it relies on historical usage levels of a particular data processing system to predict per-stage usage levels as opposed to canned usage levels which may not be reflective of what will actually be used by the data processing system.

In an optional example of this method, simulating an availability of multiple computing resources is based on machine-learning of historical operating information. In this example computing resource availability is also based on machine-learning. Such an optional example is advantageous as it allows for accurate information on availability to be used, rather than estimates based on irrelevant information.

The present specification also describes a system. The system includes a processing unit, a computer-readable storage medium, and an operating system that includes a workflow management system. The workflow management system executes to 1) schedule a number of workflows in a scheduling system for execution by a data processing system and 2) optimize the time of execution of each of each workflow. Such optimization is carried out by 1) simulating an availability of multiple computing resources over a period of time, 2) simulating an expected usage of each computing resource to execute each workflow from a start point of execution, 3) creating a superimposed time-based graph of resource usage to decide which workflow should be executed at which point of time, 4) defining for each workflow, a start point of execution, and 5) rescheduling the workflows depending on the start points of execution for each workflow to form a queue of workflows wherein the multiple computing resource usage is maximized. As described above, rescheduling the workflows based on simulated resource availability and expected usage allows for customized workflow execution based on system parameters as opposed to canned, out of the box thresholds. Moreover, creating a superimposed time-based graph allows for a visualization of the resource usage over time to verify, and allow manipulation of, workflow execution.

The present specification also describes a computer program product for managing workflow execution. The computer program product includes a computer readable storage medium having program instructions embodied therewith. The program instructions are executable by a processor, to cause the processor to 1) determine an available amount of each of multiple computing resources over time at a computing device, 2) determine an expected usage of each computing resource to execute each workflow in a queue, and 3) determine an execution order of the workflows in the queue based on the available amount of each of the multiple computing resources over time and the expected usage of each computing resource to execute each workflow in the queue. As described above, the present computer program product makes a determination regarding execution timing not just based on general computing resource usage as done in classical approaches, but makes the determination based on 1) each resource individually and 2) the expected usage of each resource to complete a particular workflow. That is, even though a CPU usage may be above a threshold where a classical approach would preclude execution, the present system and method may allow the workflow to execute because the workflow is not expected to overcommit the CPU processing energy. Moreover, the current computer program product accounts for different resource usages over a period of time, thus accounting for future overcommitments of a resource that are not contemplated by classical approaches, which make a determination based on a single point in time, and not over the life of the workflow to be executed.

DETAILED DESCRIPTION

Figure 1:
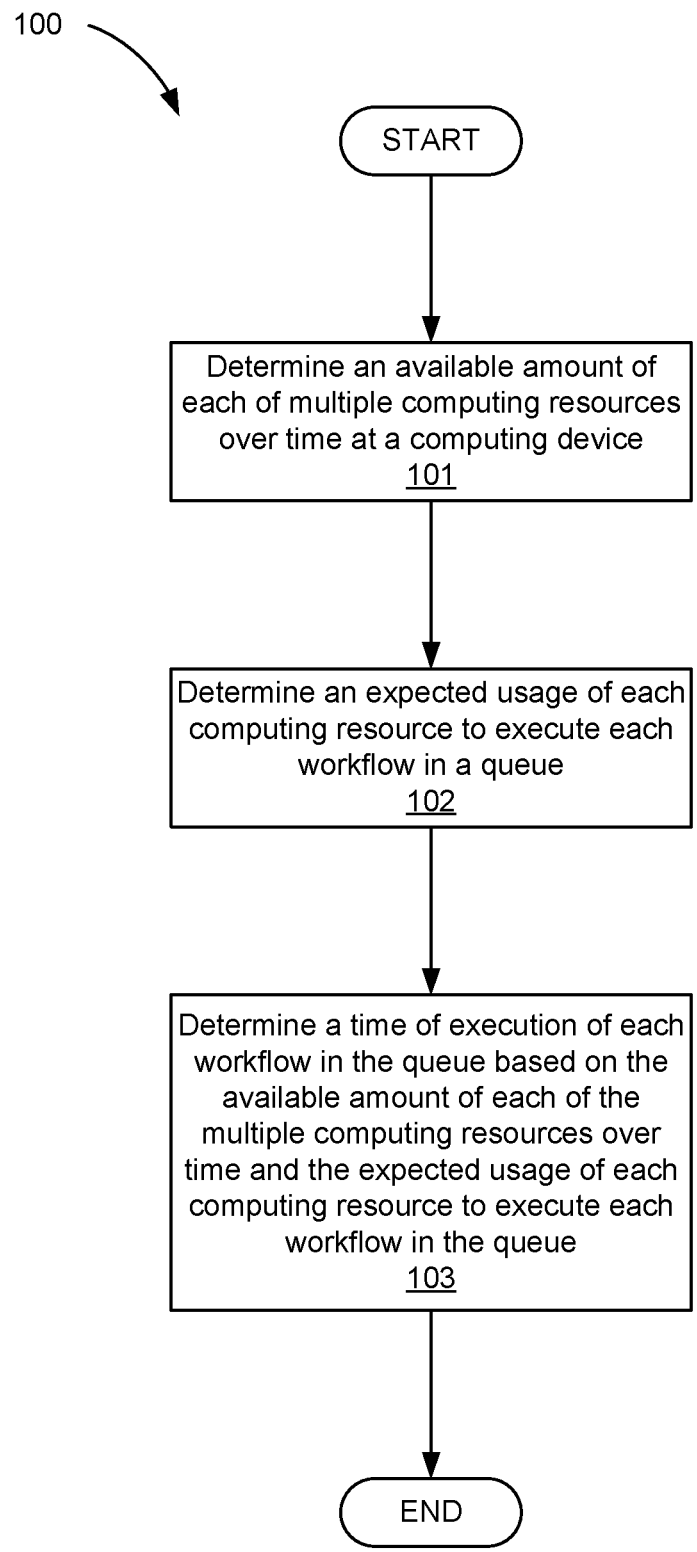
FIG. 1 depicts a flowchart of a method for determining workflow execution timing based on resource availability, according to an example of the principles described herein.

The present invention may be a system, a method, and/or a computer program product any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may in fact be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As described above, a data processing workflow is a process that loads data from a source, for example a data lake, and performs operations on the data through one or multiple operators (or stages). A workflow may be a data analysis process (i.e., a data profiling workflow, a data classification workflow, and data cleansing (deduplication, standardization, etc. . . . ) workflow, where data is read from a source and a series of operations are applied on the data to gain some insights on it. A workflow is typically executed in a workflow engine like for instance an extract, transform, load (ETL) engine, a big data cluster, or similar environments optimized to process the data. In general, these data processing workflows have a typical life cycle where at certain times in the life cycle there is a spike in CPU consumption and at other times in the life cycle there is a spike in memory consumption, and at yet another time in the life cycle there is a spike in I/O operation.

In general, more than one workflow, which all consume CPU and memory, can be executed at one point of time. In classical examples of workflow management, before a new workflow is triggered, the CPU/memory usage is observed and if it is beyond a particular threshold, the new workflow is not triggered. However, such systems may not maximize resource usage and are therefore ineffective and inefficient at managing different workflows.

That is, the current state of art does not have mechanisms to manage workflow execution as effectively as the present methods, systems, and computer program products. For example, even though the CPU/memory are above a threshold value, still accepting a new workflow may not take the CPU/memory beyond a maximum level. Accordingly, the classical systems by not accepting the new workflow, underperform. As another example, even though the CPU/memory etc. are below the threshold, still accepting a new workflow may take the CPU/memory beyond the maximum at a later point in time. Accordingly, the classical systems lead to instability of the system, which can lead to errors.

Accordingly, the present systems, methods, and computer program products address this and other issues by determining resource usage over time, determining per-resource usage, and determining an expected usage of the different resources per workflow overtime. The system then controls the execution of the various workflows based on the above described determinations.

In some examples, a time-based graph can be plotted which indicates what the future work load will look like. This can be done using machine-learning or simply by knowing the workflow type and the amount of data it accesses. Using such a system, method, and computer program product, a more efficient and malfunction resistant system is created to execute data processing workflows. As described above, classical examples do not have this functionality, as earlier it was not easy to calculate the CPU/memory consumption of a particular task. But now with containerization, it is much easy to predict the resources.

Specifically, in order to optimize the execution time of each workflow, the system includes a component to predict the expected resource usage during the different points of the execution time of the running workflows, as well as queued workflows. This component is added to the workload manager. An optimization component is also added that will search which of the queued workflows can be started at which point of time to ensure an optimal utilization of the resources, that is to ensure maximum utilization without overcommitment. In one example, this includes a system that receives, in a queue, a list of workflows to execute and determines the optimal time to execute each workflow to maximize the utilization of the system without overcommitting it. This may be done by 1) simulating the resource usage (for the different type of resources) of each workflow to be executed or being already executed all along its execution time, 2) simulating the available resources of the system in the near future based on any external factor not dependent on the workflows to be executed, and 3) determining the best execution time or order of each workflow in the queue by simulating the expected resource availability of the system during the execution of these workflows and finding the optimal execution sequence leading to a maximization of the utilization while respecting the maximum resource usage defined by the constraints of the system or policies defined by the user.

In one optional example, the resource usage of each workflow is computed by doing a static analysis of the stages involved in the workflow. That is, each workflow is made up of a sequence of stages, e.g., a filter, a sorting stage, a transform operator. Each of these stages has a known behavior regarding its resource usage, depending on the operations it implements, the input throughput, the throughput at which it can output its data to the next stage, etc. By knowing those characteristics as well as the amount of data to process, it is possible to simulate the expected execution time and resource usage for each stage and so for the whole workflow.

In an optional example, the resource usage of each job is computed by using a machine learning model to predict the resource usage based on the characteristics of the workflow. In this example, a deterministic simulation described in the above paragraph is replaced with a machine-learning approach where the system would learn from past workflows, the typical evolution of the resource usage of a workflow based on its characteristics (e.g., number of rows to process, type of workflows, type of stages in the workflow).

In yet another optional example, the available resources of the system in the future can be predicted by using machine learning models looking at the actual resource usage and external factors like the time of the day, or eventual log entries. In one specific example, the system may assume that the resource usage as it is at a certain point will not evolve over time except due to the workflows controlled by the workload manager. In a more advanced implementation, machine learning models can be trained to capture and predict the natural changes in the available resources due to external factors not dependent on the workflows controlled by the workload manager. For example, a simple example may be a time series model capturing the usual oscillation in resource usage of a system based on the time of the day or day of the week. For example, systems have more available resources during nights and weekends and have some peaks of usage at certain times in a working day. A more complex example could also predict the availability of the system based on an analysis of the system log to detect eventual problems that may cause a resource shortage such as a list of processes and/or logged users, etc.

In yet another optional example, an ideal execution plan of queued workflows is made by computing for each possible order of execution of the workflows, the simulated resource usage of the system and choosing the execution plan resulting in 1) the shortest total time of execution or 2) the highest average system utilization.

As used in the present specification and in the appended claims, the term "a number of" or similar language is meant to be understood broadly as any positive number including 1 to infinity.

Turning now to the figures, FIG. 1 depicts a flowchart of a method (100) for determining workflow execution timing based on resource availability, according to an example of the principles described herein. As described above, classical approaches to workflow management are lacking. Specifically, such approaches do not account for resource usage over time, but rather make a determination about whether to start or delay a workflow at one point in time. Moreover, such classical methods do not account for differences in resource usage over time, or differences in usage by different workflows. For example, it may be the case that a particular workflow may not, at a time t0, result in an overcommitment of a computing resource. However, the workflow may increase its usage of that particular computing resource at a later point in time, which may result in an overcommitment of that resource. The current method (100) accounts for potential future overcommitments.

Moreover, while one particular workflow may result in an overcommitment of a particular computing resource, another workflow, which has lower utilization of that computing resource may be able to be executed and still not result in an overcommitment of resources. The present system, as opposed to classical approaches, accounts for per-resource usage thus providing an advantage of allowing certain workflows that consume less of a particular computing resource. Accordingly, the present method (100) accommodates for these and other issues.

Specifically, according to the method (100), an available amount of each of multiple computing resources is determined (block 101). Such a determination may be over a period of time and is performed by machine logic. Specifically, a resource analyzer of a computing system may make such a determination (block 101). That is, a computing device that includes a data processing system may include a number of computing resources. Examples of computing resources include a system processor such as a CPU, system memory, system cache, and system input/output interface hardware. Each of these computing resources has usage which is independent of other computing resources on the computing device.

Determining (block 101) an available amount of computing resources may be done in a variety of ways and may be dependent upon the resource. For example, disk availability may be determined by measuring the amount of free space on the disks involved in the processing of the analysis. CPU availability may be determined by measuring the percentage of idle time of each CPU core available for the analysis. I/O availability may be determined by subtracting the current I/O bandwidth from the maximum bandwidth of the I/O interface. In some examples, the resource analyzer depicted in FIG. 2 may perform periodic measurements of each resource usage at short regular intervals and compute an average of the last N measurements.

Accordingly, the current method (100) rather than generally determining computing system usage, determines (block 101) a usage of individual computing resources. That is, the system depicted in FIG. 2 may individually determine a CPU usage over time, a system memory usage over time, system cache usage over time, and system input/output usage over time. In some examples, such a determination (block 101) may be made by individual resource monitors. In another example, such a determination (block 101) may be made by a single monitor. That is, a system monitor may receive usage statistics regarding each of the computing resources in a data processing system. The resource-specific monitors, or the computing system-specific monitor, pass this data to a scheduler.

As will be described below, in some examples, the determination (block 101) of available amounts of computing resources may be performed via machine-learning wherein the system analyzes historical data based on any number of criteria to determine what computing resource availability looks like over a period of time. Determining (block 101) available amounts of each individual computing resource has the advantage of providing a more refined view of computing resource usage such that certain workflows that may otherwise be precluded from execution, may be allowed to execute so long as no resource is overcommitted.

In addition to determining individual computing resource availability, the system also determines (block 102) an expected usage of each computing resource to execute each workflow in a queue. That is, a data processing system receives various workflows to be executed. These workflows may be data processing workflows that perform any number of processing operations on the data. For example, a workflow may fetch data, sort the data, apply a filter to the data, and transform the data so as to gain insight from the data. While particular reference is made to multiple stages, or operations that can be performed on data, a number of other operations may be performed as well.

A determination (block 102) of expected usage may be made in a variety of ways. One such example is via machine learning. In this example, a workflow analyzer may characterize a particular workflow based on any number of characteristics including, but not limited to, workflow type, workflow stages, amount of data to be processed, etc. The workflow analyzer may then map this workflow to previous workflows that have been performed and that have similar characteristics. For the previous workflows, the workflow analyzer may have stored an amount of resources used over time for those workflows. Accordingly, using known usage data of previous workflows having similar characteristics, the workflow analyzer can determine (block 102) the expected usage of each computing resource. The example where determining (block 102) an expected usage is based on machine learning for a whole workflow is advantageous because actual data related to a particular data processing system is more reliable than unrelated data from unrelated data processing systems, which unrelated systems may have different system characteristics/components. That is, these unrelated data processing systems, based on having different system characteristics/components, may have different expected usages than a currently analyzed system. Thus, the example where determining (block 102) the expected usage is based on machine-learning provides an advantage in providing system-specific determination (block 102) of expected usage.

In another example, determining (block 102) an expected usage may be based on per-stage levels. In a specific example, a database may include information relating to the workflow stages. That is, a data processing system may include information on the stages of a workflow and the characteristics of those stages. The information may map stages of the workflows to particular computing resource usage levels. Accordingly, as a new workflow is analyzed to determine its stages, the mapping indicates the resource usage levels for each stage of the new workflow, based on historical information for a number of stages. The system may determine an overall computing resource usage for each of multiple computing resources. An example where determining (block 102) an expected usage relies on a database with a mapping of predetermined computing resource usages to mathematical operations approximating the different resource usages over time based on the input throughput and the amount of data to process simplifies a determination (block 102) of expected usage as it may do so without a machine-learning training period.

In yet another example, determining (block 102) an expected usage may be based on machine-learning analysis of a workflow on a per-stage level. That is, rather than analyzing historical information of entire workflows, the workflow analyzer may analyze historical information of individual stages. The example where determining (block 102) an expected usage is based on a per-stage machine-learning analysis provides the advantage of even more relevant data. That is, rather than trying to identify previous workflows with the same stages, a per-stage machine-learning operation doesn't have to identify workflows with the exact same stages to provide an accurate estimate, but can compile an estimate by picking and choosing stages with similarities. That is, a workflow analyzer does not have to find a close match of two entirely separate workflows, but can piece together a representation of the workflow based on matched stages A specific example of machine learning per-stage resource usage determination (block 102) is now provided. In this example, a machine learning system would predict the resource usage and input/output throughput of a stage, based on the historical data from other workflows with the same types of stages. This includes a finer level of capture of the resource usage at a stage level, instead of at workflow level as previously described. However, when these statistics are available, it allows construction of a more accurate model by predicting the usage of resources at a stage level which can replace the static specifications of the stages as described above. In this example, usage of the overall workflow is simulated by taking into consideration the predicted usage of each stages.

In some examples, both a static per-stage resource usage determination (via a database) and a dynamic per-stage resource usage determination (via machine learning) may be implemented. For example, stage characteristics may be available for some stages used in a workflow, but not all. The missing characteristics may be computed by machine-learning while using the stage characteristics from the database where available.

In some examples, determining (block 102) an expected usage of each computing resource may a time-based determination. That is, over time different workflows utilize different computing resources to different degrees. For example, a workflow to be executed may be a data profiling workflow wherein a first stage the data is extracted from a data bank. In this stage, I/O resources may be heavily used as the data is extracted. However, CPU and memory usage may be low during this stage. During a second stage, distinct data values are computed, which computation includes sorting the data, applying operations to the data, etc. During the second stage I/O resources may have low usage, but there may be a lot of memory and disk resource usage. During a third stage, classifiers may be applied on the distinct values that have been computed. Application of the classifiers may use a lot of CPU, but may not rely very heavily on memory or I/O computing resources. Accordingly, by determining computing resource usage over time, it is determined that for this particular workflow, I/O resources are first used heavily, followed by memory and hard disk resources, and lastly by CPU resources. the example where determining (block 102) an expected usage includes determining expected usage over time provides the advantage of accounting for changes in resource usage over time such that the scheduler may account for such time-based consumption. For example, using a classical approach, A data profiling workflow may be precluded as data processing CPU usage, at a time t0, is over 80%. However, given that the data profiling workflow at time t0 does not heavily rely on CPU resources, the current method (100) may allow for the initiation of this workflow as it would not result in overcommitment of the CPU.

In some examples, such a determination (block 102) may be made multiple times during execution of workflows in the queue. That is, over time different workflows may terminate, either due to completion of the operation, interruption of a workflow by a user, or due to other circumstances. Moreover, it may be the case that other workflows not relying on the data processing system are terminated. For example, a video rendering application, which may be CPU intensive, may have terminated. Whatever the case, any of these events may change the usage/availability of the different computing resources. Accordingly, the example where determining (block 102) expected usage includes determining (block 102) expected usage multiple times during the execution of workflows in a queue provides the advantage of accounting for changes to a data processing system, or the overall computing system on which the data processing system is disposed.

The method (100) also includes determining (block 103) a time of execution of each workflow in the queue based on the available amount of each of the multiple computing resources over time and the expected usage of each computing resource to execute each workflow in the queue. That is, once the available amount of computing resources over a period of time is determined (block 101) and expected usage over time of each computing resource to execute a particular job is determined (block 102), the system can determine (block 103) a time of execution by comparing these two pieces of data.

That is, as described above, classical approaches have a more simplistic operation to determine whether or not to execute a particular workflow. That is, at a single point in time, a classical system may determine whether a resource usage, such as a CPU usage, is above a threshold amount. If it is, regardless of the expected usage of the CPU or any other computing resource at that time or a future point in time, the processor will preclude execution of any workflow. Accordingly, the present method (100) bases a decision about whether or not a workflow should be initiated, or when a workflow should be initiated, is based on additional information, thus increasing the efficiency.

The determination (block 103) of a time of execution may be done so as to determine an execution order that maximizes system resource usage without overcommitting above the maximum available resources. As one example, determining (block 103) an execution order to maximize system resource usage includes determining an execution order that results in a shortest total execution time. That is, the scheduler may simulate different variations of execution order of the different workflows in a queue to determine, which of all the variations, would result in all workflows in the queue being finished at an earliest point in time and select this as an execution order. An example where determining (block 103) a time of execution includes determining an execution order to result in a shortest total execution time is advantageous in that it allows workflows to be done in the quickest time possible such that valuable processing bandwidth is made available, at an earlier point in time, to other computing device systems, or other data processing workflows.

As another example, determining (block 103) a timing of execution of each workflow to maximize system resource usage includes determining an execution order that results in a highest average computing resource utilization. That is, the scheduler may simulate different variations of execution order of the different workflows in a queue to determine, which of all the variations, would result in a highest average usage of each computing resource over the period of time of execution. An example where determining (block 103) a time of execution includes determining an execution order to result in a highest average computing resource utilization is advantageous in that it allows workflows to be executed using the full resources of the computing device such that accurate, effective, and reliable operations are performed.

Determining (block 103) a time of execution of each workflow in a queue may be performed in a number of different ways. For example, determining (block 103) a time of execution of each workflow may include simulating each possible execution order of the multiple workflows to determine an execution order that maximizes system resource usage. That is, for a list of workflows in a queue there are finite orders of execution, and finite initialization points for each of the workflows. In this example, the system may iterate through each scenario to determine which scenario maximizes computing resource usage as defined above as a shortest total execution time, a highest average computing resource utilization, or other maximum system resource usage criteria.

As another example, workflows are first ordered based on their expected average resource usage with the most expensive workflow evaluated first. If executing the first workflow in the queue would lead to an overcommitment, it is bumped and the next workflow in the queue is analyzed. This approach has the advantage that by keeping workflows that consume less resources at the end of the queue, they may better fill small available time in the available resources, rather than if the small jobs are executed at the beginning and a percentage of the resources are available, but cannot be utilized because remaining jobs consume more resources.

As another example, determining (block 103) a time of execution of each workflow may be performed on a per time increment basis. For example, at a time t0, it may be determined whether a first workflow in a queue may be executed without resulting in an overcommitment of any of the computing resources over the life of that workflow. If so, that workflow may be executed. If execution of that workflow would result in an overcommitment of any of the computing resources, the first workflow may be moved down in the queue, and a subsequent workflow may be similarly analyzed. This may be done sequentially until each workflow in a queue is executed.

As another example, determining (block 103) a time of execution of each job may be performed on a per-workflow basis. For example, at a time t0, it may be determined whether a first workflow in a queue may be executed without resulting in an overcommitment of any of the computing resources over the life cycle of that workflow. If so, that workflow may be executed. If execution of that workflow would result in an overcommitment of any of the computing resources, the system may increment to a next point in time, t1 and determine if execution of the first workflow at that point would result in an overcommitment of any of the computing resources. This may be done sequentially through each time increment until a workflow is scheduled.

Note that in some examples, determining (block 103) a time of execution of each workflow may be based on both these examples. That is, the system may determine which workflow may be executed at a particular point in time, t0, and if not executable at that point in time without overcommitting a resource, determine when each of the workflows can be executed without overcommitting resources.

In some examples, determining (block 103) a time of execution of each workflow may be further based on a maximum usage for each computing resource. For example, the system or a user, may set a maximum threshold above which computing resource usage is not to exceed. Such a maximum threshold may define overcommitment of a computing resource. In some examples, the maximum usage for each computing resource may be the same. For example, CPU usage, memory usage, and I/O usage may be defined as "overcommitted" when more than 80% of that resource is used. In another example, the maximum usage for each computing resource may be different. For example, CPU usage may be defined as overcommitted when more than 80% of the CPU is used, memory may be defined as overcommitted when more than 70% of the memory is used, and I/O may be defined as overcommitted when more than 90% of I/O is used. The example where maximum usage is resource-specific provides the advantage of tailoring a computing system operation to a specific application, use-specific environments, computing device components, and/or user specific parameters.

With the time of execution of each workflow determined (block 103), the system may then effectuate the execution order. That is, the system depicted in FIG. 2 for example, not only determines the order of execution, or a timing of execution of each workflow, but it also carries out the execution. In some examples, this includes triggering the software that performs the data processing operation, such as sending a control signal to the system resource being consumed. In other examples, this includes introducing a delay into the data processing workflow, such that the workflow is prevented from executing at a current point in time, only to be executed at a later point in time. That is, controlling the particular system components to carry out the data processing operations may include rescheduling, or rearranging the workflows in a queue based on a determined time of execution of each workflow.

Figure 2:
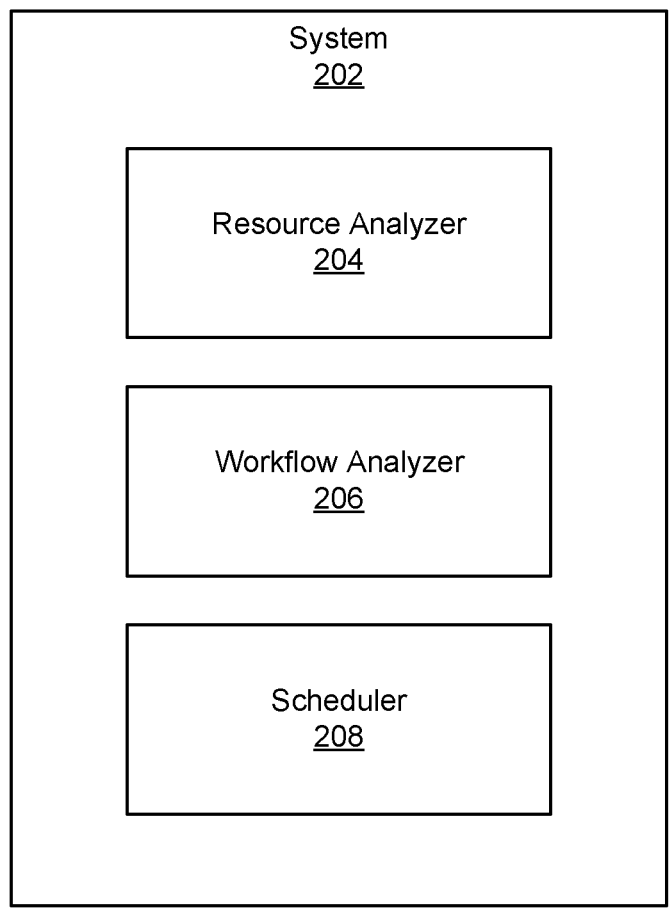
FIG. 2 depicts a system for determining workflow execution timing based on resource availability, according to an example of principles described herein.

FIG. 2 depicts a system (202) for determining workflow execution timing based on resource availability, according to an example of principles described herein. To achieve its desired functionality, the system (202) includes various components. Each component may include a combination of hardware and program instructions to perform a designated function. The components may be hardware. For example, the components may be implemented in the form of electronic circuitry (e.g., hardware). Each of the components may include a processor to execute the designated function of the component. Each of the components may include its own processor, but one processor may be used by all the components. For example, each of the components may include a processor and memory. Alternatively, one processor may execute the designated function of each of the components.

The system (202) includes a resource analyzer (204). The resource analyzer (204) determines an available amount of each of the multiple computing resources over time at a computing device. That is, the system (202) may be disposed in a computing device, which computing device includes a number of computing resources used to process data. Examples of computing resources that may be analyzed include a system processor, system memory, system cache, and a system input/output interface hardware. While specific reference is made to certain computing resources other computing resources may be similarly analyzed.

The resource analyzer (204) may determine the available amount of each resource in a variety of ways. In one example, associated with each resource is a monitor which detects activity at the computing resource. For example, a CPU monitor may count the CPU operations to execute. That is, each CPU core can execute a certain number of operations per unit of time. Each core has multiple processes started by different applications that have a list of operations to execute. The computing device includes a component that will alternatively send operations from the different processes to the CPU for execution. When the CPU has capacity for executing operations but has nothing to do (because for instance the managed processes are waiting), it is idle. The percentage of time the CPU is idle may indicate the free capacity of the CPU. Similarly, in this example, other resource monitors may similarly track requests to access the particular computing resource. While particular reference is made to one type of resource analyzer (204) other types of analyzers may be implemented in accordance with the principles described herein.

In one example, determining available amounts of each of multiple computing workflows includes comparing an actual usage to a threshold maximum usage value for the resource. For example, a CPU may have a maximum amount of active time. Accordingly, an actual amount of active time may be compared against this maximum amount to determine how much additional accesses may be made before the CPU reaches the maximum value.

In some examples, such a determination of available amounts of computing resources may be made over time, rather than simply at a single point in time. For such a time-based determination, the resource analyzer (204), in one example, analyzes historical information. For example, historically it may be the case that different computing resources have more availability during non-business hours and on weekends. While a simple example has been provided other factors and criteria may be relied on. For example, it may be the case that at certain points in the day, more users are logged in to the computing network, which drains more CPU availability. Accordingly, in this example, the resource analyzer (204) determines from historical data, how many users are likely to be logged on over a period of time, and determines what resources are available over time based on the number of users logged on. Accordingly, the system (202), and more specifically the resource analyzer (204) may use any variety of operations to determine availability not only of the computing device itself, but of individual computing resources on a per-resource level.

An example where the resource analyzer (204) determines availability per resource and over time allows for greater resource utilization. That is, as described above, rather than making a determination of an availability of all computing resources based on the availability of one particular computing resource, such as a CPU, the present system (202) makes a determination of availability on a per-resource level and over time so that each computing resource is individually analyzed for usage and thus usage of that particular computing resource can be maximized.

For example, in a classical approach, a computing device may monitor the usage of different type of resources, but considers that the amount of available resources is going to stay constant if no additional workflows are executed. The advantage of the present system (02) is that it considers the time and the fact that both the resource usage of the scheduled workflows as well as the available resources of the system are considered independently from the scheduled workflows.

This example also prevents potential future overcommitments. For example, in a classical approach, availability of a computing device may be based on a snapshot, or one point in time of the computing device. In this example, a workflow may be triggered at the point in time where it is determined CPU utilization is not overcommitted. However, it may be the case that over time this workflow's CPU usage goes up, resulting in an overcommitment at some subsequent point in time. However, using the current system (202), such a workflow would not be allowed to run because while it may, at time t0, not result in overcommitment, the resource analyzer (204) would identify that resource availability may be such at a time t4, that overcommitment of the CPU resource would likely result.

Note that while one specific example of resource analysis for one computing resource has been described, the resource analyzer (204) with its attendant monitors, may be used for each of multiple computing resources, including those specifically mentioned and any other computing resource.

The system (202) also includes a workflow analyzer (206) to determine an expected usage of each computing resource to execute each workflow in a queue. That is, each workflow that is expected to execute utilizes different computing resources, and in some cases different computing resources in different degrees at different points in time. The workflow analyzer (206), for each workflow in a queue, determines the consumption of the various computing resources by the various workflows. As described above, in different examples this may be accomplished in different ways.

For example, for each workload, a similar workflow may be identified in a database of historical workflows. Such similarity may be based on a variety of factors including number of stages, types of stages, size of data to be acted upon, etc. Data indicating resource usage for those similar workflows can be attributed to a current workflow such that the workflow analyzer (206) knows an expected usage of the current workflow based on known usages of similar workflows from a historical database. That is, in this example, the database, training data, and/or historical database includes expected usage data organized on a per-workflow basis. An example where expected usage is determined based on similarity between historical workflows provides the advantage of system-specific data thus allowing for system-specific expected usage determination.

In another example, rather than identifying similar workflows, similar stages may be identified. That is, each workflow may be broken up into stages. For a current workflow, the workflow analyzer (206) may identify those stages and from a database identify similar stages in a historical database. For example, presume a current workflow has stages A, B, C, and D, each with particular stage characteristics that define the expected computing resource usage during that stage. In this example, the workflow analyzer (206) identifies stages $A_1$, $B_1$, $C_1$, and $D_1$ which may have been previously executed. These previously executed stages, $A_1$, $B_1$, $C_1$, and $D_1$, may have similar stage characteristics as A, B, C, and D of the current workflow. Moreover, each of the historical stages may have associated expected resource usages that the workflow analyzer (206) can attribute to the corresponding stages of the current workflow such that the workflow analyzer (206) can generate an expected usage of resources to execute the entire workflow. That is, in this example the database, training data, and/or historical database includes expected usage data organized on a per-stage basis.

Either of these examples, per-stage expected usage calculation or per-workflow expected usage calculation based on historical information, may be performed by a machine-learning workflow analyzer (206) and may be advantageous as any determination of expected usage is specific to a particular computing device with the workflow analyzer (206) disposed thereon. Thus, any resulting execution strategy is specific to the device on which the system (202) is disposed. That is, different computing devices with different computing resources and different resource demands may operate differently and the current system (202) in the example where the workflow analyzer (206) is a machine-learning workflow analyzer accounts for these differences by generating a device-specific execution strategy.

The system (202) also includes a scheduler (208) to determine a time of execution of each workflow in the queue based on 1) the available amount of each of the multiple computing resources over time and 2) the expected usage of each computing resource to execute each workflow in the queue. That is, the scheduler (208) receives an output of the resource analyzer (204) and the workflow analyzer (206) to determine a time of execution and an execution order of the various workflows in the queue. The scheduler (208) may operate according to any number of principles. For example, the scheduler (208) may perform a brute force method by simulating each variation of execution orders and execution initialization times for each workflow. The variation that results in one of the shortest overall execution time or the highest overall computing resource utilization (without overcommitting) may be selected. An example where the scheduler (208) simulates each variation of execution order and initialization times ensures that a best option amongst the variations is selected.

In another example, the scheduler (208) may perform a more systematic approach where the scheduler (208) determines for a first workflow in the queue, if that workflow can be executed at a current time, t0, without overcommitting any of the computing resources. If no overcommitment would result, the first workflow is executed. If an overcommitment would result, the first workflow is moved down in the queue and the same determination is made for a second workflow. If no workflow in the queue can be executed without overcommitting a resource over the execution period of the workflow, no workflow is initiated at time t0 and the scheduler (208) performs the same analysis at a subsequent period of time, t1. That is, the scheduler (208) may determine for each time increment which workflow, if any, to execute that will 1) not overcommit any computing resource and optionally 2) result in a highest utilization or shortest execution time. Such an example where each workflow is analyzed at each time increment is advantageous in that a thorough and robust method for determining execution initialization for each workflow is determined.

Based on this information, the scheduler (208) performs any number of operations to the data processing system in which the system (202) is disposed. That is, the scheduler (208) may reschedule the execution of the workflows in the queue and may trigger execution of those workflows based on the determined schedule. That is, the scheduler (208) not only determines the timing of execution, but actually triggers execution of the workflows based on the determined schedule and timing of execution of each workflow.

Figure 3:
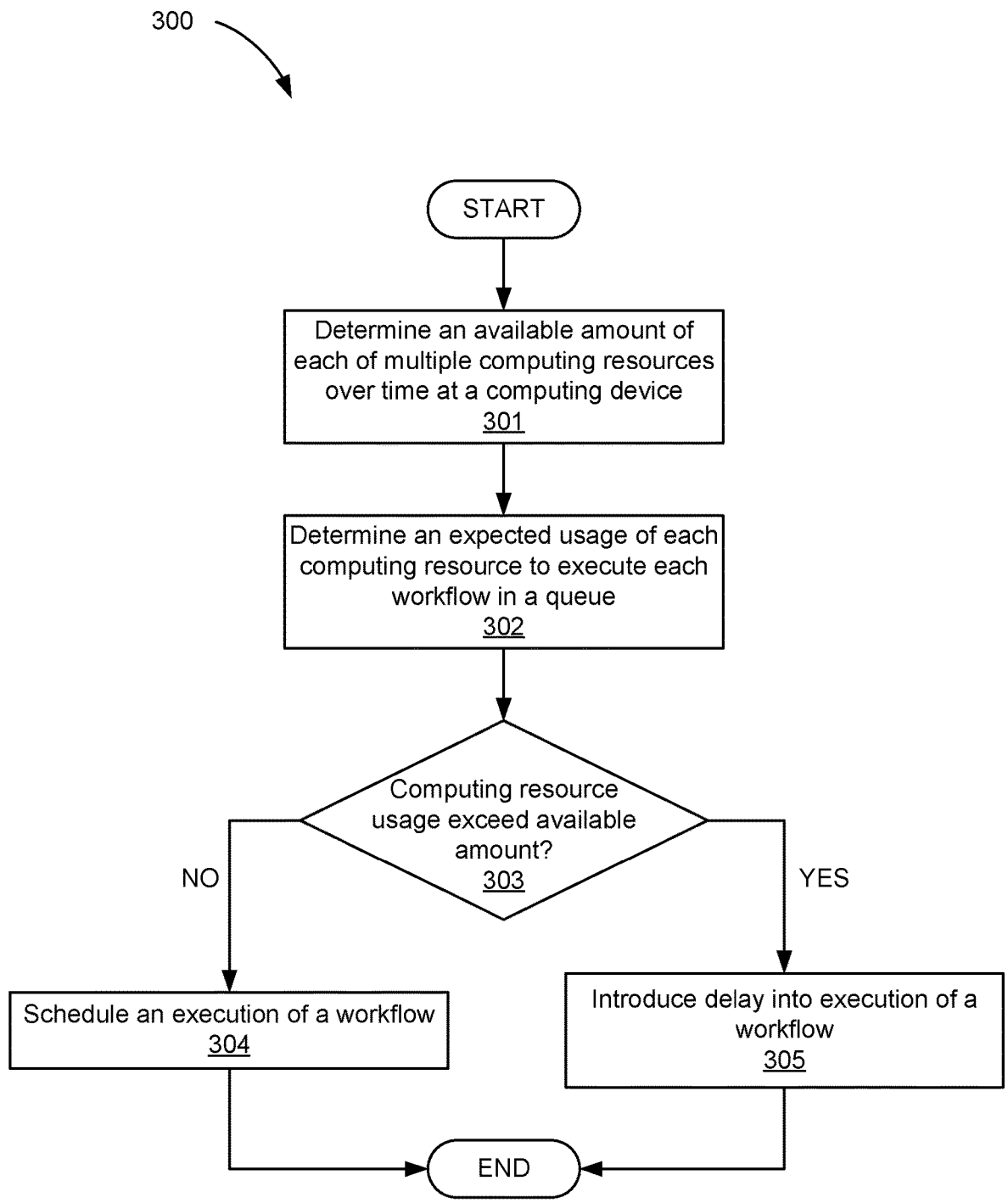
FIG. 3 depicts a flowchart of a method for determining workflow execution timing based on resource availability, according to another example of the principles described herein.

FIG. 3 depicts a flowchart of a method (300) for determining workflow execution timing based on resource availability, according to another example of the principles described herein. According to the method (300) an available amount of each of multiple computing resources of a computing device is determined (block 301) over time and an expected usage of each computing resource to execute each workflow is also determined (block 302). These operations may be performed as described above in connection with FIG. 1 by the resource analyzer (FIG. 2, 204) and workflow analyzer (FIG. 2, 206) respectively.

As described above, the method (300) includes determining a time of execution of each workflow. A specific example of a determination for one such workflow is now presented. In this example, it is determined (block 303) whether computing resource usage exceeds an available amount. This may be performed for each computing resource. For example, it may be determined whether at a particular point in time, t0, and for any point throughout an execution period of the workflow, usage of any of the computing resources being analyzed exceeds a threshold amount for that particular resource. If no computing resource usage over the execution period exceeds the respective maximum value (block 303, determination NO), the method (300) includes scheduling (block 304) an execution of a workflow when the expected usage of the any of the computing resources does not exceed the available amount of the computing resource over time. This may be done by the scheduler (FIG. 2, 208). That is, the scheduler (FIG. 2, 208) may trigger execution of a particular workflow when no computing resource is over-committed during the execution period associated with that particular workflow.

By comparison, when the expected usage of any computing resource over a period of time is projected to exceed the available amount of a computing resource (block 303, determination YES), the scheduler (FIG. 2, 208) introduces (block 305) a delay into the execution of that workflow. The delay may be indeterminate. That is, the scheduler (FIG. 2, 208) in one example may bump the workflow to a lower point in the queue to be re-evaluated at a later point in time. In another example, the delay may be determinate. That is, the scheduler (FIG. 2, 208), rather than executing the workflow at a time, t0, may determine a future point in time, i.e., t1-tn, at which to execute the workflow.

The determination of the time at which to execute the workflow may be based on a statistical analysis. That is, just as the scheduler (FIG. 2, 208) compares expected usage of resources vs. available amounts of computing resources for a time t0, the scheduler (FIG. 2, 208) may compare expected usage vs. available amounts for times t1-tn to determine at what point the particular workflow could be scheduled, based on the current workload of the computing resources, without resulting in an overcommitment of any of the computing resources. The time t1-tn that is selected as an initialization of execution for the workflow may be based on one of 1) an earliest available execution time, 2) an execution time that would result in a shortest overall execution of each workload, and/or 3) a highest utilization of computing resources.

As a specific example of scheduling, the scheduler (FIG. 2, 208) based on an output of the resource analyzer (FIG. 2, 204) may determine an availability of a first computing resource at a particular point of time. Specifically, the resource analyzer (FIG. 2, 204) may determine a high availability of the first computing resource at the particular point in time. The workflow analyzer (FIG. 2, 206) may then determine that an expected usage of that resource is high to execute a first workflow in the queue. Output of these components is passed to the scheduler (FIG. 2, 208) which schedules the first workflow consuming a large amount of the first computing resource to start at the particular point in time so long as a resulting computing resource usage over time does not peak to greater than a threshold amount.

Figure 4:
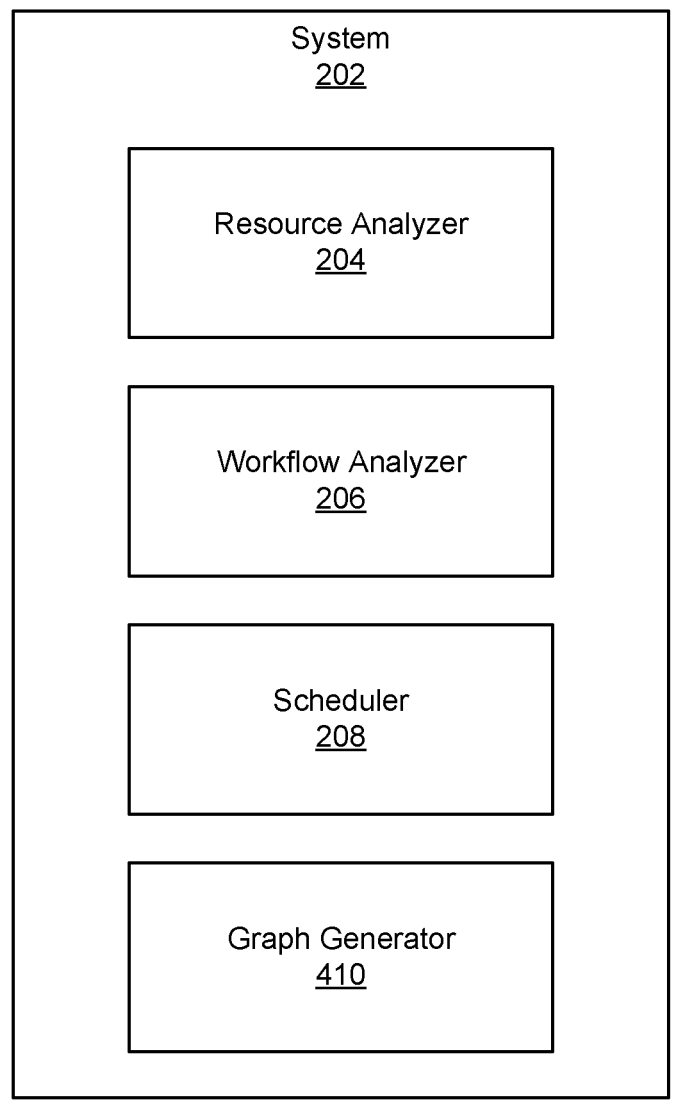
FIG. 4 depicts a system for determining workflow execution timing based on resource availability, according to another example of principles described herein.

FIG. 4 depicts a system (202) for determining workflow execution timing based on resource availability, according to another example of principles described herein. In the example depicted in FIG. 4, the system (202) includes a resource analyzer (204), workflow analyzer (206), and scheduler (208) as depicted in FIG. 2. In the example depicted in FIG. 4, the system (202) includes additional elements. For example, the system (202) includes a graph generator (410) go generate a visual representation of the information determined by the scheduler (208). That is, the graph generator (410) generates and displays a time-based graph of the available amount of each of the multiple computing resources over time. That is, the workflow analyzer (206) may not only analyze the expected resource usage based on execution of the queued workflows, but may also analyze the resource usage of currently executing workflows over a period of time and may generate a graph that indicates usages of the different resources over time. In some examples, different computing resource usage levels over time may be depicted on different time-based graphs. In another example, each computing resource usage level may be depicted on a single graph.

Figure 6:
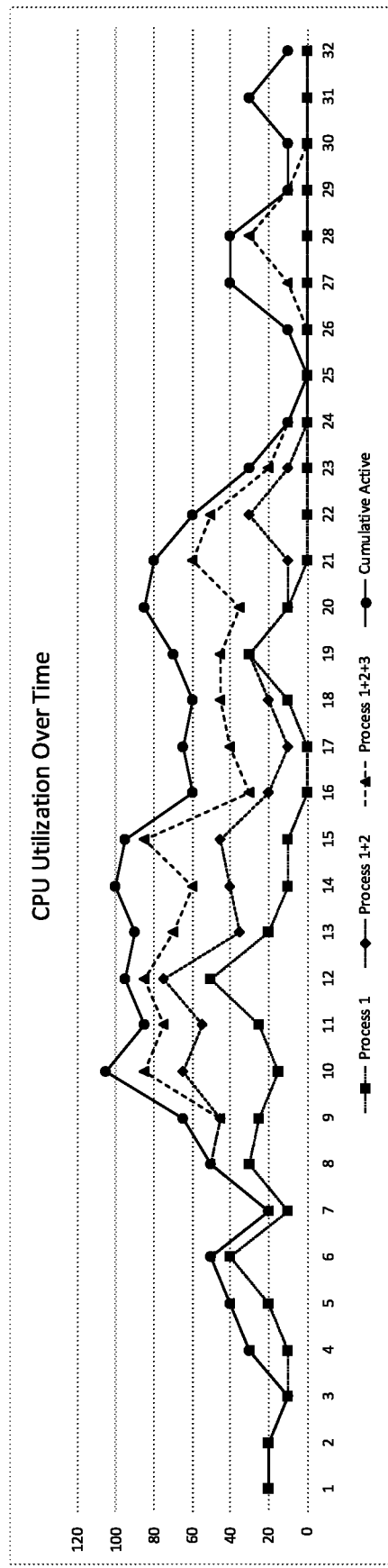
FIG. 6 depicts a time-based graph of available amounts of a computing resource over time, according to an example of the principles described herein.
Figure 7:
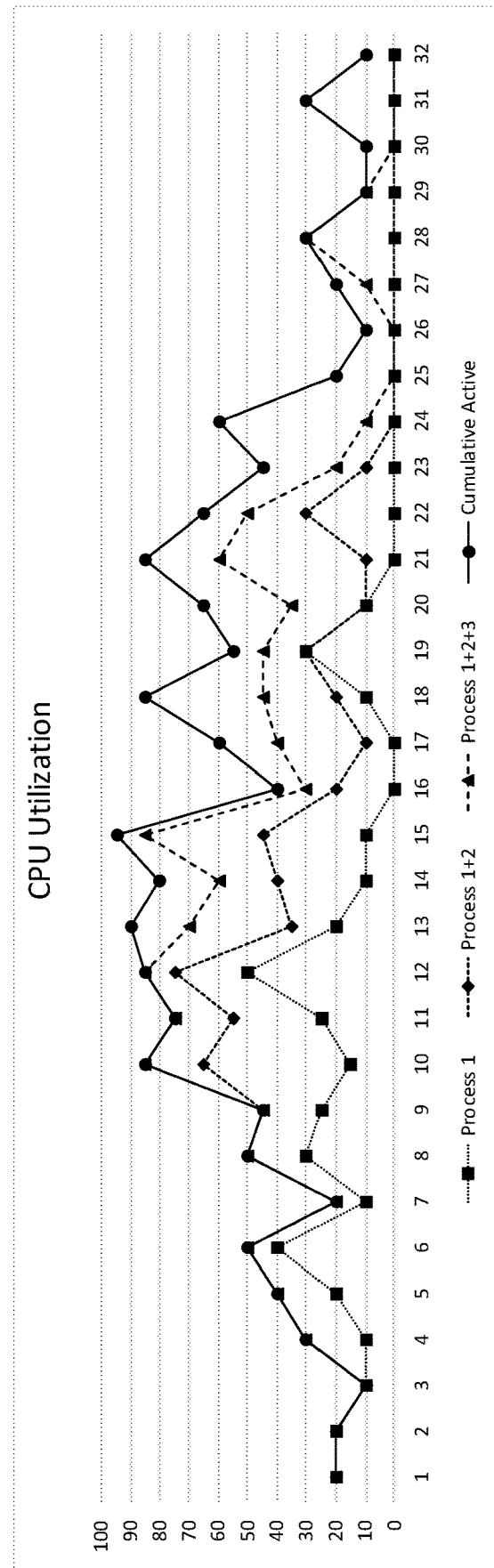
FIG. 7 depicts a time-based graph of available amounts of a computing resource over time, according to another example of the principles described herein.

In addition to displaying a graph of available amounts of computing resources, the graph generator (410) also superimposes expected usage of each computing resource to execute each workflow in the queue. That is, the superimposed graph indicates what a currently available amount of a computing resource is and what the availability would look like were the queued workflow to be executed. Examples of such time-based graphs are depicted in FIGS. 6 and 7 below.

The graphs that are generated by the graph generator (410) may be reflective of the timing of execution determined by the scheduler (208) or may be used by the scheduler (208) in making the determination. That is, in some examples the time-based graphs may be merely informative to a user of what is scheduled whereas in other examples the time-based graphs may be relied on by the scheduler (208) in determining a timing of execution of each workflow. That is, the graphs described may be relied on to determine a shortest total execution time of the workflows in a queue and may also indicate overall computing resource usage such that the scheduler (208) may select execution timings so as to maximize overall resource usage. That is, the example of the system (202) that includes a graph generator (410) is advantageous as the superimposed graphs allow determination of if/when computing resource usage exceeds a maximum value and allows for a determination as to which workflow should be executed at which point in time to maximize the computing resource utilization without exceeding its maximum usage.

As described above, in some examples, the scheduler (208) analyzes multiple, if not each, variation of execution orders and execution timings to result in a schedule that results in maximum computer utilization. Accordingly, in some examples, the graph generator (410) generates multiple superimposed expected usages of different workflows on the time-based graph. In this example, the scheduler (208) determines a time of execution of each workflow based on a comparison of multiple superimposed expected usages of different workflows on the time-based graph. For example, a first superimposed expected usage for a first workflow may indicate that CPU usage hovers around 80% throughout the execution of the first workflow. A second superimposed expected usage for a second workflow may indicate that CPU usage hovers around 90% and does not exceed a maximum amount of 100% utilization. Accordingly, in this example, the scheduler (208) may select to execute the second workflow as it would result in greater CPU utilization while not exceeding the maximum amount.

As a specific example, when a data processing workflow gets triggered, a predictive graph, or predictive graphs, are created for key resources, (e.g., CPU, memory utilization, etc.). Based on the predictive graph, it will be evident if there would be a resource shortage. If no resource shortage occurs, then the processing workflow is run, otherwise it will wait and give option for a job, potentially requiring higher resources, that will not lead to hitting the boundary of resource usage.

Thus in summary, the system (202) accepts as an input, a group of jobs to execute and optimizes the time of execution of each of these jobs by 1) simulating the usage of the system in next period of time, i.e., a usage of the amount of resources, 2) simulating the expected resource usage of each of these jobs from a start point of execution, i.e., a demand for resources, and 3) creating a superimposed time series map of the resource usage to effectively decide which job should be executed at which point of time to maximize the system utilization without exceeding its maximum usage.

Figure 5:
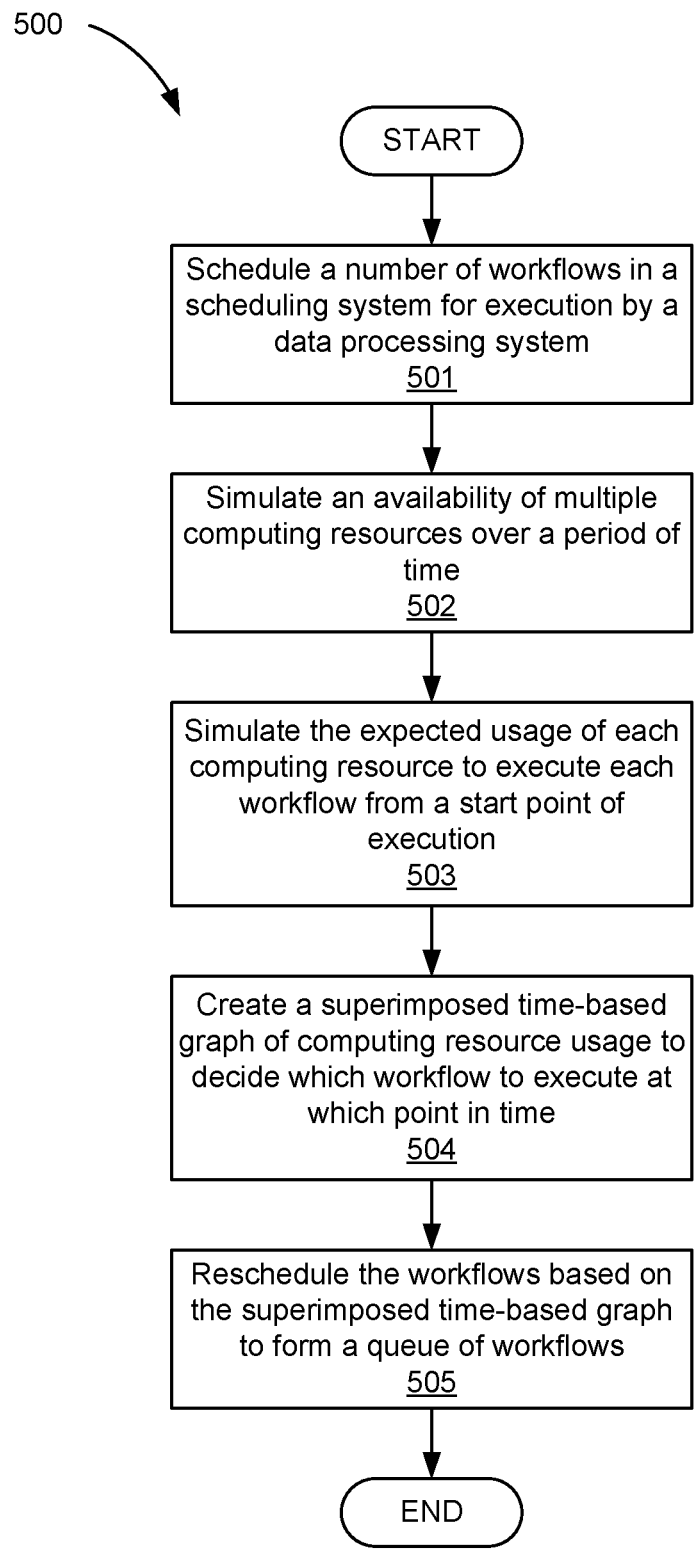
FIG. 5 depicts a flowchart of a method for determining workflow execution timing based on resource availability, according to another example of the principles described herein.

FIG. 5 depicts a flowchart of a method (500) for determining workflow execution timing based on resource availability, according to another example of the principles described herein. According to the method (500), a number of workflows are scheduled (block 501) in a scheduling system for execution by a data processing system. A data processing system refers to a system that performs any number of operations on data. That is, a data processing system takes as input a workflow to execute some data. A workflow refers to a particular operation, or sequence of operations that are to be performed. For example, a workflow may be an extract, transform, and load workflow where data is extracted from a source, transformed in some way, and loaded into a target location. While specific reference is made to one type of workflow with particular stages, other types of workflows are also implementable. For example, workflows may extract data, sort data, apply test operations, transform data, apply classifiers to the data, etc. In some examples, scheduling (block 501) a number of workflows includes scheduling workflows based on a first-come first-serve system. That is, workflows are placed sequentially in a queue in the order they are received. The example where scheduling (block 501) a number of workflows includes scheduling workflows based on a first-come first-serve system is advantageous in that it reduces the overall wait time of all workflows in the queue.

In some examples, scheduling (block 501) a number of workflows includes scheduling workflows based on a priority identifier. That is, certain workflows, when placed in a queue, are bumped to the top of the queue based on their priority, regardless of other workflows already in the queue. The example where scheduling (block 501) a number of workflows includes scheduling workflows based on a priority level is advantageous in that it reduces the overall execution time of those workflows that have high importance to be finished quickly.

According to the method (500), machine logic of the system (FIG. 2, 202) optimizes a time of execution of each workflow. This may be done by a number of sub-operations. For example, this may include simulating (block 502) an availability of multiple computing resources over a period of time. As described above, simulating (block 502) the usage of a system in a next period of time is done in one example by static analysis of each running workflow and in another example, by using machine learning to predict the resource usage. That is, simulating (block 502) an availability of multiple computing resources in one example is based on machine-learning of historical information as described above.

In some examples, simulating (block 502) an availability of multiple computing resources over a period of time is based on computing resource usage in addition to the workflows in the scheduling system. That is, the scheduling system includes workflows to be executed by a data processing system, which workflows utilize computing resources. On a computing device however, there may be other non-data processing workflows that are also consuming computing resources. For example, web browsers, graphics rendering programs, etc. all utilize computing resources and the utilization of these computing resources impacts the availability of the computing resources to be used for data processing workflows. Accordingly, the simulation (block 502) of the availability of multiple computing resources may account for these additional drains on computing resources.

As a specific example, simulating (block 502) the availability of computing resources based on multiple additional non-data processing workflows may be based on historical operating information. For example, at different points of the day, or different days of the week, or for a different number of logged users, computing resources may be more or less available. Accordingly, the system (FIG. 2, 202) may account for this historical operating usage. For example, the resource analyzer (FIG. 2, 204) may analyze historical operating information, in a machine-learning or static fashion, to determine that more CPU is available during the hours of 12:00 and 1:00 when individuals at an organization may be at lunch. Accordingly, this information may be relied on by the scheduler (FIG. 2, 208) when scheduling the workflows. That is, the resource analyzer (FIG. 2, 204) may simulate an availability of multiple computing resources based on historical operating information related to non-workflow usage of these computing resources which historical operating information includes a time of day, a day of the week, logged users, and in some examples expected downtimes which are a feature of any computing device that can be predicted or at least estimated. The example where simulating (block 502) the availability of multiple computing resources includes simulating the availability of computing resources based on additional, non-data processing workflows has the advantage of accurately depicting the operating conditions of a computing device. That is, it provides a complete picture of computing resource usage even outside of the data processing environment.

The method (500) also includes simulating (block 503) the expected usage of each computing resource to execute each workflow from a start point of execution. As described above, such a simulation (block 503) or determination of expected usage of each computing resource may be done in a number of ways. For example, simulating (block 503) expected usage may include performing machine-learning of historical usage levels to predict an expected resource usage based on job characteristics. That is, over time the workflow analyzer (FIG. 2, 206) may compile data relating to resource usage for different workflows and may classify the workflows based on any number of criteria including number of stages, types of stages, and size of data to be acted upon, among others. When simulating (block 502) expected usage in this example, the workflow analyzer (FIG. 2, 206) matches the workflow to be analyzed with a similar workflow from the historical database to determine an expected usage. In this example, matching the workflows may be based on any number of criteria including number of stages, types of stages, quantity of data to be acted upon, and others.

In another example, simulating (block 503) the expected usage may be based on machine-learning or static analysis of a per-stage level. That is, the workflow analyzer (FIG. 2, 206) may determine stages of the workflow and determine stage characteristics for each stage. That is, a workflow is comprised of different stages. Examples of stages include, but are not limited to extract, classify, transform, filter, load, etc. While specific examples are provided of a few different types of stages different stages may be implemented in accordance with the principles described herein.

Each stage has various characteristics which affect computing resource usage. For example, stage characteristics may include an executed operation, input throughput, output throughput, and a size of the data processed. Knowing the stages and stage characteristics, the workflow analyzer (FIG. 2, 206) can determine expected computing resource usage per stage in a variety of ways. In one example, each stage has predetermined expected resource usage levels based on the stage characteristics. Accordingly, the workflow analyzer (FIG. 2, 206) can determine expected computing resource usage per stage of the workflow and combine these per-stage expected puting resource usage levels to generate an overall expected resource usage level for the entire workflow.

In another example, the workflow analyzer (FIG. 2, 206) may perform machine learning of historical usage levels for each stage to predict an expected resource usage level based on stage characteristics. Accordingly, the workflow analyzer (FIG. 2, 206) can determine expected resource usage per stage of the workflow and combine these per-stage expected resource usage levels to generate an overall expected resource usage level for the entire workflow.

As a specific example, the workflow analyzer (FIG. 2, 206) may find the expected CPU/memory usage for the job. This may include finding the number of stages, kind of stages, number of input records and performing a static analysis. As described above, sorting stages may be CPU intensive whereas lookup stages can be memory intensive. Based on the correlation of the stage and input and historical runs data, the resource usage can be predicted.

The graph generator (FIG. 4, 410) may then create (block 504) a superimposed time-based graph of computing resource usage to decide which workflow to execute at which point in time. Specifically, the graph generator (FIG. 4, 410) may create a superimposed time series map of the resource usage to effectively decide whether the next work flow can be accepted or not. More specifically, based on the various stages in the workflow, the graph generator (FIG. 4, 410) plots a time series map (t1 to tn) for the current workflow and already scheduled workflows. Based on this time series map, the scheduler (FIG. 2, 208) can introduce a delay or put on hold a particular workflow if in the future there will be resource crunch.

Put another way, data processing systems typically run a set of operations on each of the input data. Each operation includes several processing stages (sorting, transformation, lookup, merge etc.) In this example, each of the test set can be run and using statistical model, the resource consumption can be plotted as a time series map (t1 to tn) delineating what is the input of the stage and what is the output of the stage and the resource consumption. Using regression, a prediction can be made as to when the system will spike in terms of memory, CPU, or other computing resource.

Note, that without machine-learning this information can be generated using historical runs. For example, the workflow analyzer (FIG. 2, 206) would say that a lookup operation will require more memory and a sort operation will require more CPU and based on the data, the computing requirements can be easily predicted. The scheduler (FIG. 2, 208) may schedule the workflow if submitting it does not lead to resource contention. Examples of different time-based graphs are depicted in FIGS. 6 and 7.

The scheduler (FIG. 2, 208) can then reschedule (block 505) the workflows based on the superimposed time-based graph to form a queue of workflows wherein the multiple computing resource usages are maximized. That is, the actual execution of various workflows may be triggered based on the schedule proposed by the scheduler (FIG. 2, 208) such that computing resources are maximized or overall execution time is reduced.

In some examples, logs may be kept to improve future predictions. For example, during machine learning, historical data is relied on to determine expected usage. Accordingly, data relating to a re-scheduled (block 505) workflow may be sent and used as training data for a machine learning mechanism. That is information relating to the stages, stage characteristics actual resource usage levels, etc. may be passed to the system (FIG. 2, 202) and more specifically to the workflow analyzer (FIG. 2, 206) that such that future simulations of expected usage have more data to rely on and are therefore more accurate. Analyzing the logs of the system (FIG. 2, 202) can help better predict the available resources (block 502) in subsequent operations. For instance, the logs may help the system (FIG. 2, 202) determine what other tasks are running that may compete for resources with the scheduled workflows. Eventual error messages in the log may also give an indication on situation that could lead to a resource shortage in the near future.

In some examples, the logs are checked to see if any anomaly is observed, say at particular time the workflows are deviating from the trained model. In the example where logs are kept, the method (500) provides a specific advantage in improving the training data that is used to predict future expected usage. That is, the system (FIG. 2, 202) evolves over time to become more and more reliable as more and more data is collected and added to the training data from which the system (FIG. 2, 202) manages workflow execution timing.

In some examples this optimization, i.e., (blocks 502, 503, 504, 505) is repeated multiple times during execution of workflows in the queue. The repetition accounts for changes to the computing resource usage and/or the queue over time. That is, as described above, for any number of reasons, the computing resource usage and/or the workflows in the queue may change over time. Repeating these steps is advantageous in that it allows for updates to the scheduling order whereas a classical approach may not make more determinations past a single point in time.

A specific example of the method (500) is now provided. In this example, each workflow is triggered by some messaging system, such as a kafka message. When a workflow is triggered, the system (FIG. 2, 202) identifies which stages are involved. These stages may be dependent on results of other stages or may independent of the results of other stages. Those independent stages can potentially run in any order. So, the system (FIG. 2, 202) identifies which stage can be run next, giving preference to the one on which other stages are dependent. With the stages identified, the system (FIG. 2, 200) determines exactly what are the different stages in the workflow and the system (FIG. 2, 202) also sees what is the input to the workflow A model is then applied to predict the CPU/Memory/IO requirements at different times ($t_1$ to $t_n$) based on the stage that the data processing will pass through and the input. The system (FIG. 2, 202) then plots a predictive time series map (model was already trained by regression earlier, and it is subsequently and potentially re-trained by these results) and super impose it with the currently running jobs. It is then determined if the system, in its current state, can accommodate the workflow. If yes, the scheduler (FIG. 2, 208) schedules it and goes back to pick and analyze another one.

FIG. 6 depicts a time-based graph (612) of available amounts of a computing resource over time, according to an example of the principles described herein. Specifically, FIG. 6 depicts a time-based graph (612) of the processes described in Table (1) below.

TABLE 1

| Time | Process 1 | Process 2 | Process 3 | Process 4 | Cumulative Active |
|---|---|---|---|---|---|
| 1  | 20 | 0  | 0  | 0  | 20  |
| 2  | 20 | 0  | 0  | 0  | 20  |
| 3  | 10 | 0  | 0  | 0  | 10  |
| 4  | 10 | 20 | 0  | 0  | 30  |
| 5  | 20 | 20 | 0  | 0  | 40  |
| 6  | 40 | 10 | 0  | 0  | 50  |
| 7  | 10 | 10 | 0  | 0  | 20  |
| 8  | 30 | 20 | 0  | 0  | 50  |
| 9  | 25 | 20 | 0  | 20 | 65  |
| 10 | 15 | 50 | 20 | 20 | 105 |
| 11 | 25 | 30 | 20 | 10 | 85  |
| 12 | 50 | 25 | 10 | 10 | 95  |
| 13 | 20 | 15 | 35 | 20 | 90  |
| 14 | 10 | 30 | 20 | 40 | 100 |
| 15 | 10 | 35 | 40 | 10 | 95  |
| 16 | 0  | 20 | 10 | 30 | 60  |
| 17 | 0  | 10 | 30 | 25 | 65  |
| 18 | 10 | 10 | 25 | 15 | 60  |
| 19 | 30 | 0  | 15 | 25 | 70  |
| 20 | 10 | 0  | 25 | 50 | 85  |
| 21 | 0  | 10 | 50 | 20 | 80  |
| 22 | 0  | 30 | 20 | 10 | 60  |
| 23 | 0  | 10 | 10 | 10 | 30  |
| 24 | 0  | 0  | 10 | 0  | 10  |
| 25 | 0  | 0  | 0  | 0  | 0   |
| 26 | 0  | 0  | 0  | 10 | 10  |
| 27 | 0  | 0  | 10 | 30 | 40  |
| 28 | 0  | 0  | 30 | 10 | 40  |
| 29 | 0  | 0  | 10 | 0  | 10  |
| 30 | 0  | 0  | 0  | 10 | 10  |
| 31 | 0  | 0  | 0  | 30 | 30  |
| 32 | 0  | 0  | 0  | 10 | 10  |

Note that in the example depicted in FIG. 6, the series "Process 1" indicates the expected CPU usage of a first process, the series "Process 1+2" indicates the expected CPU usage of a first process and a second process, the series "Process 1+2+3" indicates the expected CPU usage of a first process, second process, and third process, and the series "Cumulative Active" indicates the expected CPU usage of all processes active at that time period, which may include the fourth process. That is, for times t1-t3, cumulative active is equal to process 1 and process 2, for times t4-t8 is equal to processes 1 and 2, for time t9 is equal to processes 1, 2, and 4, for times t10-t15 is equal to processes 1, 2, 3, 4 and so on.

As depicted in Table (1) and the graph (612), workflow 4 was started at time 9, when the CPU utilization in the previous time was just 50% (with a threshold being 80%). However, at time 10, utilization crossed the threshold that could potentially lead to an error as indicated by the "Cumulative Active" series being greater than 100. The present system (FIG. 2, 202) and methods avoid such a scenario as depicted in FIG. 7. Note that while FIG. 6 depicts a time-based graph (612) of CPU utilization over time, similar graphs could be generated for other computing resource usage over time.

FIG. 7 depicts a time-based graph (714) of available amounts of a computing resource over time, according to another example of the principles described herein. Specifically, FIG. 7 depicts a time-based graph (714) of CPU utilization over time implementing the methods (200, 500) described herein, which data is provided below in Table (2).

TABLE 2

| Time | Process 1 | Process 2 | Process 3 | Process 4 | Cumulative Active |
|---|---|---|---|---|---|
| 1  | 20 | 0  | 0  | 0  | 20 |
| 2  | 20 | 0  | 0  | 0  | 20 |
| 3  | 10 | 0  | 0  | 0  | 10 |
| 4  | 10 | 20 | 0  | 0  | 30 |
| 5  | 20 | 20 | 0  | 0  | 40 |
| 6  | 40 | 10 | 0  | 0  | 50 |
| 7  | 10 | 10 | 0  | 0  | 20 |
| 8  | 30 | 20 | 0  | 0  | 50 |
| 9  | 25 | 20 | 0  | 0  | 45 |
| 10 | 15 | 50 | 20 | 0  | 85 |
| 11 | 25 | 30 | 20 | 0  | 75 |
| 12 | 50 | 25 | 10 | 0  | 85 |
| 13 | 20 | 15 | 35 | 20 | 90 |
| 14 | 10 | 30 | 20 | 20 | 80 |
| 15 | 10 | 35 | 40 | 10 | 95 |
| 16 | 0  | 20 | 10 | 10 | 40 |
| 17 | 0  | 10 | 30 | 20 | 60 |
| 18 | 10 | 10 | 25 | 40 | 85 |
| 19 | 30 | 0  | 15 | 10 | 55 |
| 20 | 10 | 0  | 25 | 30 | 65 |
| 21 | 0  | 10 | 50 | 25 | 85 |
| 22 | 0  | 30 | 20 | 15 | 65 |
| 23 | 0  | 10 | 10 | 25 | 45 |
| 24 | 0  | 0  | 10 | 50 | 60 |
| 25 | 0  | 0  | 0  | 20 | 20 |
| 26 | 0  | 0  | 0  | 10 | 10 |
| 27 | 0  | 0  | 10 | 10 | 20 |
| 28 | 0  | 0  | 30 | 0  | 30 |
| 29 | 0  | 0  | 10 | 0  | 10 |
| 30 | 0  | 0  | 0  | 10 | 10 |
| 31 | 0  | 0  | 0  | 30 | 30 |
| 32 | 0  | 0  | 0  | 10 | 10 |

In the example depicted in FIG. 7, the workflow 4 was started at a time 13, when the CPU utilization in the previous time was 85 (threshold at 80). However, the system never crossed the maximum CPU utilization limit that could potentially lead to a malfunction. In classical approaches, the time series 4 would have had to wait to start. That is, as depicted in FIG. 6, even though CPU utilization may be low at a time 9 when series 4 was started, due to changes in resource utilization overtime, an overcommitment of the CPU still occurred. The present system and methods are advantageous by avoiding this scenario by accounting for resource utilization over time. That is, as depicted in FIG. 7, even though series 4 was started at a time when a classical approach would have prohibited it (i.e., threshold above 80), no malfunction occurred as the system (FIG. 2, 202) analyzed a time-based resource utilization to determine that no overcommitment would occur.

Figure 8:
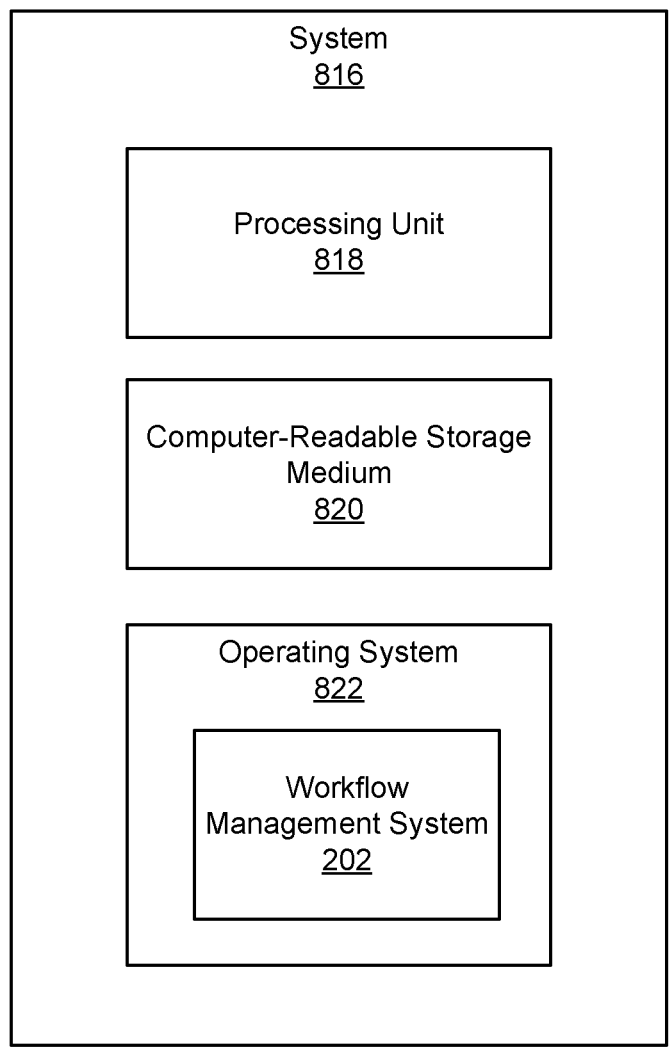
FIG. 8 depicts a system for determining workflow execution timing based on resource availability, according to another example of principles described herein.

FIG. 8 depicts a system (816) for determining workflow execution timing based on resource availability, according to another example of principles described herein. In general, the system (816) may be any variety of computing devices. For example, the computing system (816) may be a desktop computer, a laptop computer, a server, or any other such device that includes processors and hardware components.

The system (816) includes a processing unit (818) and a computer-readable storage medium (820). The computer-readable storage medium (820) may be, for example, but is not limited to, an electronic storage device, a magnetic storage device, an optical storage device, an electromagnetic storage device, a semiconductor storage device, or any suitable combination of the foregoing. The system (816) also includes an operating system (822) that includes a workflow management system (202). The workflow management system (202), as described above, schedules a number of workflows in a scheduling system for execution by a data processing system and optimizes the time of execution of each workflow. This may be done by simulating an availability of multiple computing resources over a period of time, simulating an expected usage of each computing resource to execute each workflow from a start point of execution, creating a superimposed time-based graph of resource usage to decide which workflow should be executed at which point in time, define for each workflow a start point of execution, and rescheduling the workflows depending on the start points of execution for each workflow to form a queue of workflows wherein the multiple computing resource usage is maximized. In some examples, the workflow management system (202) simulates an expected usage of running and queued workflows.

Figure 9:
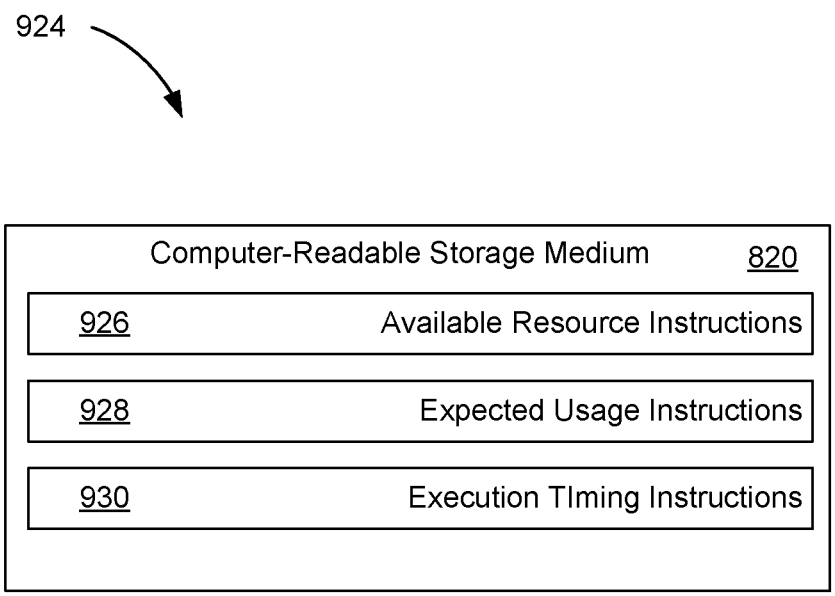
FIG. 9 depicts a computer program product with a computer readable storage medium for determining workflow execution timing based on resource availability, according to an example of principles described herein.

FIG. 9 depicts a computer program product (924) with a computer readable storage medium (820) for determining workflow execution timing based on resource availability, according to an example of principles described herein. To achieve its desired functionality, a computing system includes various hardware components. Specifically, a computing system includes a processor and a computer-readable storage medium (820). The computer-readable storage medium (820) is communicatively coupled to the processor. The computer-readable storage medium (820) includes a number of instructions (926, 928, 930) for performing a designated function. The computer-readable storage medium (820) causes the processor to execute the designated function of the instructions (926, 928, 930).

Referring to FIG. 9, available resource instructions (926), when executed by the processor, cause the processor to determine an available amount of each of multiple computing resources over time at a computing device. Expected usage instructions (928), when executed by the processor, may cause the processor to determine an expected usage of each computing resource to execute each workflow in a queue. As described above, in some examples doing so may be based on historical information. Execution timing instructions (930), when executed by the processor, may cause the processor to determine a timing of execution of each of the multiple workflows in the queue based on the available amount of each of the multiple computing resources over time and the expected usage of each computing resource to execute each workflow in the queue.

Aspects of the present system and method are described herein with reference to flowchart illustrations and/or block diagrams of methods, apparatus (systems) and computer program products according to examples of the principles described herein. Each block of the flowchart illustrations and block diagrams, and combinations of blocks in the flowchart illustrations and block diagrams, may be implemented by computer usable program code. In one example, the computer usable program code may be embodied within a computer readable storage medium; the computer readable storage medium being part of the computer program product. In one example, the computer readable storage medium is a non-transitory computer readable medium.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   determining, by machine logic, an available amount of each of multiple computing resources over time at a computing device;
   determining, by the machine logic, an expected usage of each computing resource to execute each workflow in a queue;
   determining, by the machine logic, a time of execution and an execution order of each workflow in the queue on the computing device by:
      simulating different execution order variations and execution initialization times of each workflow in the queue based on the available amount of each of the multiple computing resources over time and the expected usage of each computing resource to execute each workflow in the queue; and
      simulating each possible execution order of multiple workflows to determine an execution order that maximizes system resource usage, wherein determining the execution order that maximizes system resource usage comprises at least one of:
         determining an execution order that results in a shortest total execution time; and
         determining an execution order that results in a highest average computing resource utilization; and
   rescheduling, by the machine logic, the workflows in the queue based on the execution order that maximizes system resource usage.

2. The computer-implemented method of claim 1, wherein each workflow utilizes different computing resources to different degrees over time.

3. The computer-implemented method of claim 1, wherein, determining, by the machine logic, the time of execution of each workflow in the queue is further based on a maximum usage for each computing resource.

4. The computer-implemented system of claim 1, determining, by the machine logic, a time of execution of each workflow in the queue further comprises:
   determining, at a particular point in time, an availability of a first computing resource; and
   scheduling a workflow consuming a large amount of the first computing resource to start at the particular point in time so long as a resulting computing resource usage over time does not peak to greater than a maximum value.

5. The computer-implemented method of claim 1, further comprising scheduling an execution of a workflow when the expected usage of a computing resource does not exceed the available amount of the computing resource over time.

6. The computer-implemented method of claim 5, further comprising introducing a delay into the execution of a workflow when the expected usage of a computing resource exceeds the available amount of the computing resource.

7. A system comprising a processor, memory and instructions to cause the processor to execute:
   a resource analyzer to determine an available amount of each of multiple computing resources over time at a computing device;
   a workflow analyzer to determine an expected usage of each computing resource to execute each workflow in a queue;
   a scheduler to simulate different execution order variations and execution initialization times of each workflow in the queue to determine a time of execution and an execution order of each workflow in the queue on the computing device based on the available amount of each of the multiple computing resources over time and the expected usage of each computing resource to execute each workflow in the queue; and a graph generator to:
generate a time-based graph of the available amount of each of the multiple computing resources over time; and superimpose on the time-based graph, expected usage of each computing resource to execute each workflow in the queue to:
determine if computing resource usage exceeds a maximum usage value over the execution of the workflow; and
determine which workflow should be executed at which point in time to maximize the computing resource usage without exceeding the maximum usage value,
wherein the scheduler to reschedule each workflow in the queue to maximize the computing resource usage without exceeding the maximum usage value based on the superimposed time-based graph.

8. The system of claim 7, wherein the computing resources are selected from the group consisting of:
a system processor;
system memory;
system cache; and
system input/output interface hardware.

9. The system of claim 7 wherein, the scheduler determines a time of execution of each workflow based on a comparison of multiple superimposed expected usages of different workflows on the time-based graph.

10. A computer-implemented method, comprising:
scheduling, by machine logic, a number of workflows in a scheduling system for execution by a data processing system; and
optimizing, by the machine logic, a time of execution of each workflow by:
simulating an availability of multiple computing resources over a period of time;
simulating an expected usage of each computing resource to execute each workflow from a start point of execution;
creating a superimposed time-based graph of computing resource usage to decide which workflow to execute at which point of time; and
rescheduling the workflows based on the superimposed time-based graph to form a queue of workflows wherein the multiple computing resource usage is maximized.

11. The computer-implemented method of claim 10, wherein optimizing the time of execution of each workflow is repeated multiple times during execution of workflows in the queue.

12. The computer-implemented method of claim 10, wherein simulating the expected usage of each computing resource comprises performing machine-learning of historical usage levels to predict an expected resource usage level based on job characteristics.

13. The computer-implemented method of claim 10, wherein simulating the expected usage of each computing resource comprises:
determining stages of the workflow; and
determining stage characteristics for each stage, wherein each stage has predetermined expected resource usage levels based on the stage characteristics.

14. The computer-implemented method of claim 13, wherein the stage characteristics comprise at least one of:
an executed operation;
input throughput;
output throughput; and
size of data processed.

15. The computer-implemented method of claim 10, wherein simulating the expected usage of each computing resource comprises:
determining stages of the workflow;
determining stage characteristics for each stage; and
performing machine-learning of historical usage levels to predict an expected resource usage level based on the stage characteristics for each stage.

16. The computer-implemented method of claim 10, wherein simulating an availability of multiple computing resources over the period of time is based on computing resource usage in addition to the workflows in the scheduling system.

17. The computer-implemented method of claim 10, wherein simulating an availability of multiple computing resources is based on historical operating information from the group consisting of:
a time of day;
a day of a week;
logged users; and
expected downtime.

18. The computer-implemented method of claim 17, wherein simulating the availability of multiple computing resources is based on machine-learning of the historical operating information.

19. A system comprising:
a processing unit;
a computer-readable storage medium; and
an operating system comprising a workflow management system executing to:
schedule a number of workflows in a scheduling system for execution by a data processing system; and
optimize a time of execution of each of each workflow by:
simulating an availability of multiple computing resources over a period of time;
simulating an expected usage of each computing resource to execute each workflow from a start point of execution;
creating a superimposed time-based graph of resource usage to decide which workflow should be executed at which point of time;
defining for each workflow, the start point of execution; and
reschedule the workflows depending on the start points of execution for each workflow to form a queue of workflows wherein the multiple computing resource usage is maximized.

20. The system of claim 19, wherein the workflow management system executes to simulate an expected usage of running and queued workflows.

21. A computer program product, the computer program product comprising a computer readable storage medium having program instructions embodied therewith, the program instructions executable by a processor, to cause the processor to:
determine an available amount of each of multiple computing resources over time at a computing device;
determine an expected usage of each computing resource to execute each workflow in a queue; and determine an execution order of each workflow in the queue on the computing device by:
simulating different execution order variations and execution initialization times of each workflow based on the available amount of each of the multiple computing resources over time and the expected usage of each computing resource to execute each workflow in the queue;
creating a superimposed time-based graph of computing resource usage to decide which workflow to execute at which point of time; and
rescheduling the workflows based on the superimposed time-based graph to form a queue of workflows wherein the multiple computing resource usage is maximized.

22. The computer program product of claim 21, wherein the program instructions are executable by the processor, to cause the processor to determine the expected usage of each computing resource based on historical information.

* * * * *